United States Patent [19] [11] 4,058,504
Yonemitsu et al. [45] Nov. 15, 1977

[54] PROCESS FOR TERMINATING POLYPHENYLENE ETHERS REACTIONS WITH AMINO CARBOXYLIC ACIDS AND REDUCING AGENTS

[75] Inventors: Eiichi Yonemitsu, Kashiwa; Akitoshi Sugio, Ohmiya; Atuo Kuramoto; Hiroyuki Urabe, both of Tokyo, all of Japan

[73] Assignee: Mitsubishi Gas Chemical Company, Inc., Japan

[21] Appl. No.: 677,843

[22] Filed: Apr. 16, 1976

[30] Foreign Application Priority Data

Apr. 18, 1975 Japan ................................. 50-47259

[51] Int. Cl.$^2$ ............................................. C08G 65/44
[52] U.S. Cl. .......................... 260/47 ET; 260/47 CZ; 260/47 CP; 260/49
[58] Field of Search ......... 260/47 ET, 47 CZ, 47 CP, 260/49

[56] References Cited

U.S. PATENT DOCUMENTS

| 3,573,254 | 3/1971 | Factor | 260/47 |
| 3,787,358 | 1/1974 | Nishioka et al. | 260/47 ET |
| 3,817,919 | 6/1974 | Nakashio et al. | 260/47 ET |
| 3,843,604 | 10/1974 | Pravednikov et al. | 260/47 ET |
| 3,951,917 | 4/1976 | Floryan et al. | 260/47 ET |

Primary Examiner—Lester L. Lee
Attorney, Agent, or Firm—Wenderoth, Lind & Ponack

[57] ABSTRACT

In the production of polyphenylene ethers by oxidative polycondensation of phenols in the presence of a complex catalyst, an aminocarboxylic acid derivative and a reducing agent are simultaneously added to the reaction mixture when the resulting polyphenylene ether has attained the desired degree of polymerization, thereby to terminate the polymerization and simultaneously purify the reaction mixture. Hence, a stable purified polymer can be obtained.

4 Claims, No Drawings

PROCESS FOR TERMINATING POLYPHENYLENE ETHERS REACTIONS WITH AMINO CARBOXYLIC ACIDS AND REDUCING AGENTS

This invention relates to a process for preparing polyphenylene ethers by the oxidative polycondensation of phenols, in which the termination of the polymerization and the purification of the reaction mixture are carried out simultaneously. More specifically, the invention relates to a process for preparing polyphenylene ethers by reacting phenols with oxygen in the presence of a complex catalyst containing copper, manganese or cobalt wherein an aminocarboxylic acid derivative and a reducing agent are added to the polymerization reaction system thereby to perform the termination of the polymerization at a stage of any desired degree of polymerization and the purification of the polymerization reaction mixture simultaneously.

Generally, polyphenylene ethers are produced by the oxidative self-polycondensation of monohydroxy phenols in the presence of an oxygen-containing gas and a metal-amine complex catalyst. The phenols used in such methods are monohydroxy monocyclic phenols of the following formula

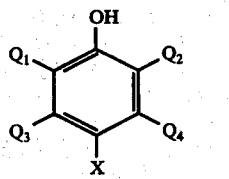

wherein X represents a hydrogen atom, $Q_1$ represents a monovalent substituent selected from the group consisting of alkyl groups, haloalkyl groups (there are at least two carbon atoms between the halogen and the phenyl nucleus), alkoxy groups and haloalkoxy groups (there are at least two carbon atoms between the halogen and the phenyl nucleus), the α-carbon atom of the alkyl groups and the haloalkyl groups being a primary or secondary carbon atom, $Q_2$, $Q_3$ and $Q_4$ are the same as $Q_1$ or represent a hydrogen atom or a halogen atom, and at least one of $Q_3$ and $Q_4$ is a hydrogen atom. Polyphenylene ether homopolymers and copolymers having a phenylene ether structural unit derived from at least one of such phenols are known.

In the preparation of the above polymers, it is important to control the degree of polymerization of the polymer as desired, and in this regard, methods have already been proposed in which to obtain polyphenylene ethers of the desired degree of polymerization by terminating the polymerization of phenols at the desired stage.

For example, U.S. Pat. Nos. 3,306,874 and 3,306,875 disclose a method which involves adding a mineral acid such as hydrochloric acid or sulfuric acid, an organic acid such as acetic acid, or a base such as potassium hydroxide or sodium hydroxide to the polymerization system in the last stage of the reaction thereby to destroy the complex catalyst and terminate the polymerization. However, all of the acids or bases mentioned above do not always contribute to the inactivation of any catalyst system, and sometimes, the active terminals of the polymer remain unremoved. With certain catalyst systems, therefore, the polymerization does not completely end even after adding acids or bases. This frequently results in the progress of the polymerization, the gellation of the product, or the depolymerization of the product that causes a decrease in molecular weight. Or as a result of adding mineral acids, traces of the acids remain in the polymer to affect the coloration or stability of the polymer adversely. In order to eliminate such adverse effects, a complicated washing step for substantially removing such acids from the resultant polymer is required. When an organic acid is used, its removal becomes more complicated because it has a large coefficient of distribution to the polymer solution. Furthermore, the organic acid does not have enough ability to inactivate the metal complex catalyst by decomposition.

Japanese Patent Publication No. 18692/61 and Japanese Laid-Open Patent Publication No. 1341/71 teach another methods of inactivating the catalyst by adding a chelating agent to the polymerization reaction system. On the other hand, Japanese Laid-Open Patent Publication No. 99599/74 discloses a method in which the metal ion is chelated with a water-soluble chelating agent to extract it into the aqueous phase. With any of these methods, it is difficult to terminate the polymerization completely.

Still another method suggested comprises pouring the polymer solution into a non-solvent for the polymer to precipitate and separate the polymer thereby to obtain the desired degree of polymerization. According to this method, however, impurities present in the reaction mixture sometimes remain in the resultant polymer to affect its quality, and a large amount of the non-solvent as a precipitating agent must be used.

We previously suggested a method for terminating the polymerization of phenols by adding at least one of dihydroxybenzenes and benzoquinones and a reducing agent to the reaction system (German Laid-Open Patent Publication No. 2430130). This method permits the complete termination of the polymerization, but the separability of the reaction mixture from the aqueous solution of the additives is not so good. Consequently, long periods of time are required to separate the reaction mixture from the aqueous solution by allowing the reaction mixture to stand. Furthermore, sometimes, the polymer recovered from the reaction mixture is not completely satisfactory from the standpoint of commercial acceptability. Because of these defects in commerical operations, this method is not satisfactory in every respect.

Accordingly, it is an object of this invention to provide a process which eliminates the defects of the conventional methods for adjusting the degree of polymerization of the resulting polymer, and by which the polymerization can be easily terminated at a stage where the desired degree of polymerization has been attained.

Another object of this invention is to provide a process by which the desired final polymer in the polymerization reaction mixture can be purified simultaneously with the termination of the polymerization at a stage where the desired degree of polymerization has been attained.

Our extensive investigations in an attempt to achieve the above objects led to the discovery that the oxidative polycondensation can be terminated when the polyphenylene ether has attained the desired degree of polymerization, and at the same time, the reaction mixture can be purified, by adding an aminocarboxylic acid derivative and a reducing agent to the polymerization reaction system.

According to the present invention, there is provided a process for producing polyphenylene ethers which comprises reacting phenols with oxygen in the presence of a complex of a metal selected from the group consisting of copper, manganese and cobalt as a catalyst, wherein an aminocarboxylic acid derivative and a reducing agent are added to the polymerization reaction mixture when the resulting polyphenylene ether has attained the desired degree of polymerization, thereby to terminate the polymerization. Furthermore, in the process of this invention the purification of the polymerization reaction mixture is performed simultaneously.

That the process of this invention makes it possible to terminate the oxidative polycondensation of phenols at a stage where the polyphenylene ether has attained the desired degree of polymerization, and to purify the reaction mixture simultaneously means that various advantages such as those mentioned below can be brought about by the present invention.

1. Not only can the polymerization catalyst be inactivated, but also the catalyst metal can be removed substantially from the reaction mixture containing the resulting polymer.

2. The radicals remaining in the resulting polymer can be neutralized, and therefore, the polymer chain is stabilized. Consequently, not only the polymerization reaction but also side-reactions such as the depolymerization of the polymer from the terminal chain, or a crosslinking reaction caused by the pulling-out of hydrogen attached to the α-carbon of the side chain of the polymer can be inhibited.

3. The contamination of the product with oligomers of phenols and/or coloring substances such as diphenoquinone contained in the reaction mixture can be prevented.

Accordingly, the process of the present invention makes it possible to produce polyphenylene ethers of high quality having the desired degree of polymerization with good reproducibility by a simple expedient of adding an aminocarboxylic acid derivative and a reducing agent to the polymerization reaction system.

The high quality of the resulting polymer can, for example, be substantiated by the fact that even when the polymerization reaction mixture obtained after the termination of the polymerization is concentrated at 100° C, the polymer recovered from the concentrated reaction mixture does not change in intrinsic viscosity and molecular weight distribution before and after the concentration treatment. This shows that neither the polymerization reaction, nor the depolymerization reaction and the crosslinking reaction occur at all. The polymer obtained by this method has very good thermal stability and a high level of whiteness.

Since complete termination of the polymerization and the purification of the reaction mixture can be achieved simultaneously in the present invention, the polymer obtained can be recovered by simple methods such as a concentration-precipitation method, a steam precipitation method or a direct spray drying method without any likelihood of deteriorating the quality of the polymer.

These recovering methods have not been utilized for the recovery of the polymers in the conventional methods because they cause the deterioration of the polymers. In view of this, it is surprising that the process of this invention can afford polymers which are so stable as to enable the use of such recovering methods. Hence, the present invention has provided a very advantageous process for giving polyphenylene ethers having superior quality.

According to the process of this invention, at least one aminocarboxylic acid derivative and at least one reducing agent are added to the reaction system. With certain catalyst systems, the polymerization may be terminated by adding only the aminocarboxylic acid derivative, but in this case, the amount of the aminocarboxylic acid derivative must be large. Generally, when the aminocarboxylic acid derivative is used along, side reactions such as a depolymerization reaction and/or crosslinking reaction occur when the reaction mixture is heated. Hence, the reaction system is unstable, and in many cases, it is difficult to terminate the reaction completely. On the other hand, the use of the reducing agent alone does not at all cause the termination of the polymerization, but rather results in the contamination of the reaction mixture. Accordingly, the simultaneous presence of the aminocarboxylic acid derivative and the reducing agent in the polymerization reaction system is an essential requirement for simultaneously achieving the complete termination of the polymerization and the purification of the reaction mixture. Namely, it is necessary to use the reducing agent in combination with the aminocarboxylic acid derivative so that the reducing agent having a strong reducing power will not cause the precipitation of metal from the reaction system as a result of reducing a matallic compound used as an oxidative polycondensation catalyst for phenols.

The aminocarboxylic acid derivatives used in the process of this invention denote polyalkylene polyamine polycarboxylic acids, cycloalkylene polyamine polycarboxylic acids, polyalkylene ether polyamine polycarboxylic acids, aminopolycarboxylic acids, aminocarboxylic acids, salts of these acids with alkali metals or alkaline earth metals, and mixed alkali metal-/alkaline earth metal salts of these acids. These aminocarboxylic acid derivatives can be used either alone or in admixture. Examples of preferred aminocarboxylic acid derivatives are ethylenediaminetetracetic acid, nitrilotriacetic acid, iminodiacetic acid, glycine, diethylenetriaminepentaacetic acid, triethylene-tetraminehexaacetic acid, 1,2-diaminocyclohexanetetraacetic acid, N-hydroxydiethylethylenediamine-N,N',N'-triacetic acid, ethylene glycol diethyl ether diaminetetraacetic acid, ethylenediaminetetrapropionic acid, and their salts. The ethylenediaminetetraacetic acid (to be referred to as EDTA) and its salts, nitrilotriacetic acid and its salts, and diethylenetriaminepentaacetic acid and its salts are especially suitable in the process of this invention.

The reducing agent used in combination with the aminocarboxylic acid derivative in this invention include any substances which induce reduction in a broad sense that is accounted for by their ability to give an electron to a certain substance.

Specific examples of reducing agents that can be effectively used in the present invention are sulfur suboxides such as sulfur dioxide or sulfurous acid; salts of lower oxyacids of sulfur such as sulfite salts, bisulfite salts or dithionite salts; salts containing metal in the lower atomic valency of higher oxyacids or hydroacids such as ferrous sulfate or stannous chloride; nitrogen-containing reducing compounds such as hydroxylamine and its salt, or hydrazine and its derivatives; and boron hydride. The dithionite salts examplified by sodium dithionite, sulfite salts and hydrazine are especially preferred.

The amount of the aminocarboxylic acid derivative is at least one mole, preferably 1.5 to 5.0 moles, per mole of the metallic compound used as an oxidative polycondensation reaction catalyst for phenols. The amount of the reducing agent is 1.0 to 15.0 moles, preferably 2.0 to 12.0 moles, per mole of the metallic compound in the above catalyst. These additives may be added directly to the polymerization reaction system, or as a solution in water, an alcohol or other solvents. It is especially preferred however to use them in the form of an aqueous solution, because when the additives are added as an aqueous solution to the reaction mixture, impurities such as the catalyst to be removed from the resulting polymer are extracted into the aqueous solution, and the aqueous phase can be easily separated from the organic phase.

In the process of this invention, it is necessary that the aminocarboxylic acid derivative and the reducing agent are present simultaneously, as stated hereinabove. The order of addition of the aminocarboxylic acid derivative and the reducing agent is optional so long as they are present in the reaction system at the same time. However, it is especially preferred to add them simultaneously to the reaction system.

The additives used in this invention are added at a stage where the polyphenylene ether resulting from the oxidative polycondensation reaction of a phenol has attained the desired degree of polymerization. Usually, the addition is effected before side-reactions, e.g., depolymerization and/or crosslinking, occur towards the end of the normal polycondensation reaction, but the time of addition is not specifically limited to it.

The process of the present invention can be applied to the oxidative polycondensation reaction of phenols using copper salt-amine complex catalysts disclosed in U.S. Pat. Nos. 3,306,874 and 3,306,875 and Japanese Patent Publication No. 16120/74; manganese salt-alkali complex catalysts disclosed in Japanese Patent Publications Nos. 3195/67 and 30354/70, and catalysts consisting of a cobalt salt-amine complex or a cobalt-containing chelate disclosed in Japanese Patent Publications Nos. 4673/67 and 37992/70. The present invention is also applicable to the oxidative polycondensation reaction of phenols using the aforesaid complex catalyst containing copper, manganese or cobalt as a promotor, and also the polycondensation reaction using a copper, manganese or cobalt salt as a catalyst.

The phenols used in the process of this invention are monohydroxy monocyclic phenols of formula (I), and these phenols may be used or in admixture of two or more. The polymers obtained as a final product are homopolymers or copolymers containing at least 30 phenylene ether structural units derived from the phenols. In particular, the process of this invention is suitably applied to the production of a homopolymer of a 2,6-dialkylphenol or copolymer of a 2,6-dialkylphenol and a 2,3,6-trialkylphenol.

A preferred general embodiment of the process of this invention comprises simultaneously adding an aminocarboxylic acid derivative and a reducing agent preferably as an aqueous solution in a small amount of water to the polymerization reaction mixture at that stage of the known oxidative polycondensation of phenols in which the polymer has attained the desired degree of polymerization, stirring the mixture to bring the polymerization reaction mixture into contact with the aqueous solution and thus to neutralize the remaining radicals in the polymer to inactivate the catalyst, extracting impurities such as the metallic compound and the low-molecular-weight polymers of the phenol and diphenoquinone in the reduced form into the aqueous solution, separating and removing the aqueous solution from the polymerization reaction mixture, and recovering the polymer from the resulting organic solution.

The following Referential Examples and Examples illustrate the present invention specifically. All parts and percentages are by weight unless specifically indicated.

REFERENTIAL EXAMPLE 1

250 Parts of 2,6-xylenol was dissolved in 2500 parts of toluene, and a solution of 1.25 parts of cuprous iodide in 185 parts of n-butylamine was added to the resulting solution, and an excess of air was blown into the mixture with stirring. The reaction temperature was maintained at 40° C, and the solvent which dissipated together with the air was collected by cooling and returned to the reaction system. In ninety minutes after the initiation of the reaction, the stirring and the air blowing were stopped, and the reaction mixture was immediately withdrawn. Erlenmeyer flasks with a stopper were each charged with 100 parts of the resulting reaction mixture, and the various additives shown in Table 1 were added. After thorough shaking, the flasks were allowed to stand at 40° C. At the end of the periods indicated in Table 1, a small amount of the reaction mixture was withdrawn, and methanol was added to precipitate the polymer. The intrinsic viscosity of the polymer was measured at 25° C using cholorform as a solvent. The results are shown in Table 1.

As can be seen from Table 1, the above treatment did not result in the complete termination of the polymerization, but the polymerization reaction, a partial crosslinking reaction or the depolymerization reaction proceeded. Consequently, the intrinsic viscosity of the polymer increased, or lowered.

Table 1

| Run No. | Type of additive | Additive/ Cu compound (mole ratio) | Water added/ reaction mixture (volume ratio) | Changes in intrinsic viscosity (dl/g) with the passage of time | | |
|---|---|---|---|---|---|---|
| | | | | 0 | 5 hours | 24 hours |
| 1 | Not added | — | — | 0.60 | 0.73 | Gelled |
| 2 | 70% sulfuric acid | 1.05 | — | 0.60 | 0.50 | 0.48 |
| 3 | 48% aqueous solution of sodium hydroxide | 25 | — | 0.60 | 0.50 | 0.42 |
| 4 | Hydrazine | 10 | 1/10 | 0.60 | 0.50 | 0.66 |
| 5 | EDTA | 5 | 1/10 | 0.60 | 0.55 | 0.48 |
| 6 | Sodium potas- | | | | | |

Table 1-continued

| Run No. | Type of additive | Additive/ Cu compound (mole ratio) | Water added/ reaction mixture (volume ratio) | Changes in intrinsic viscosity (dl/g) with the passage of time | | |
|---|---|---|---|---|---|---|
| | | | | 0 | 5 hours | 24 hours |
| | sium tartrate | 10 | 1/10 | 0.60 | 0.53 | 0.49 |

REFERENTIAL EXAMPLE 2

143 Parts of n-butylamine and 0.89 part of cuprous iodide were dissolved in 1000 parts of toluene, and air was passed at a rate of 2000 parts by volume/minute at 40° C with stirring. A solution of 180 parts of 2,6-xylenol in 800 parts of toluene was added dropwise to the solution over the course of 40 minutes. After the addition, the reaction was continued, and in 84 minutes after the initiation of addition, the air blowing and the stirring were stopped. The reaction mixture was immediately divided into two portions, and these reaction mixtures were treated by the following methods.

Method A

An aqueous solution of 5 moles, per mole of the copper compound in the catalyst used, of EDTA in one-tenth time the volume of the reaction mixture of water was added immediately to one portion of the reaction mixtures, and the mixture was vigorously stirred. After separating the aqueous solution, the residue was washed twice with water in an amount of one-tenth time the volume of the reaction mixture. Then, the reaction mixture was concentrated at reduced pressure at 50° C until the volume of the reaction mixture became half the original volume. Methanol was added to the concentrated reaction mixture to precipitate and recover polyphenylene ether.

Method B

An aqueous solution of 5 moles, per mole of the copper compound in the catalyst used, of sodium dithionite in one-tenth time the volume of the reaction mixture of water was immediately added to the other portion of the reaction mixture, and the mixture was vigorously stirred. The aqueous solution was then separated, and the residue was washed twice with water in an amount of one-tenth time the volume of the reaction mixture. It was concentrated in the same way as in the method A until its volume became half of the original volume. Methanol was added to the concentrated reaction mixture, and polyphenylene ether was recovered.

As seen from Table 2 below, there was a change in the intrinsic viscosity of the polyphenylene ether in each process of treatment. It is appreciated therefore that the use of the aminocarboxylic acid derivative or the reducing agent alone does not give an effect of sufficiently terminating the polymerization.

Table 2

| | Intrinsic viscosity (dl/g, 25° C, CHCl$_3$) of the polymer at various stages of Treatment | | | |
|---|---|---|---|---|
| | Stages of treatment | | | |
| Method of treatment | Immediately before termination of the reaction (when the air blowing was stopped) | Immediately after separation of the aqueous solution which followed the addition of the terminater and subsequent stirring | Immediately after separation of the aqueous solution which followed the second washing with water | After concentration of the reaction mixture |
| [A] | 0.550 | 0.500 | 0.495 | 0.400 |
| [B] | 0.550 | 0.575 | 0.650 | 0.731 |

*The terminater denotes EDTA or sodium dithionite.

EXAMPLE 1

143 Parts of n-butylamine and 0.89 part of cuprous iodide were dissolved in 1000 parts of toluene, and at 40° C, air was passed through the solution at a rate of 2000 parts by volume/minute with stirring. A solution of 180 parts of 2,6-xylenol in 800 parts of toluene was added dropwise over the course of 40 minutes. After the addition, the reaction was continued, and after a lapse of 75 minutes from the initiation of the addition of the monomer, the air blowing and stirring were stopped. Immediately, a separately prepared aqueous solution of 2.0 moles, per mole of the copper compound in the catalyst used in the polymerization, of EDTA and 2.0 moles, per mole of the copper compound, of sodium dithionite in one-tenth time the volume of the reaction mixture of water was added to the reaction mixture, and the mixture was vigorously stirred, followed by standing to separate the aqueous solution. The polyphenylene ether recovered from the reaction mixture which had been subjected to the above treatment had an intrinsic viscosity (in CHCl$_3$ at 25° C) of 0.495 dl/g which was the same as the intrinsic viscosity of the polymer immediately before the termination of the polymerization.

EXAMPLE 2

1003 Parts of n-butylamine and 6.43 parts of cuprous iodide were dissolved in 11550 parts of toluene, and air was passed into the solution at a rate of 14400 parts by volume/minute at 40° C with stirring. A solution of 1300 parts of 2,6-xylenol in 1450 parts of toluene was added dropwise to the resulting solution over the course of 41 minutes. After the addition, the reaction was continued for 50 minutes, and the air blowing and stirring were stopped. A solution of 4 moles, per mole of the copper compound in the catalyst used, of a tetrasodium salt of EDTA, and 3 moles, per mole of the copper compound, of sodium dithionite in one-tenth time the volume of the reaction mixture of water was added immediately to the resulting reaction mixture, and the mixture was vigorously stirred. After separating the aqueous solution, the residue was washed once with 0.16 time the volume of the reaction mixture of water.

After the washing, the reaction mixture assumed a very beautiful pale orange yellow color. The reaction mixture was concentrated at reduced pressure until its weight became 45% of the initial weight. The polymer had an intrinsic viscosity (in $CHCl_3$ at 25° C) of 0.589 dl/g immediately before termination of the reaction, and the finally obtained polymer had an intrinsic viscosity of 0.590 dl/g. There was no substantial change in intrinsic viscosity incident to the heat concentration of the reaction mixture.

EXAMPLE 3

The same oxidative polycondensation as in Example 2 was carried out except that 10 moles, per mole of the copper compound, of hydrazine was used instead of the sodium dithionite, and the resulting reaction mixture was treated in the same way as in Example 2. The polymer immediately before the termination of the reaction had an intrinsic viscosity of 0.589 dl/g, but the polymer finally obtained had an intrinsic viscosity of 0.590 dl/g. Thus, same as in Example 2, there was no substantial change in intrinsic viscosity incident to the heat concentration of the reaction mixture, and it was demonstrated that hydrazine used instead of the sodium dithionite was also effective as a reducing agent.

EXAMPLE 4

488 Parts of 2,6-xylenol, 54 parts of 2, 3,6-trimethylphenol, 3 parts of cupprous iodide and 350 parts of n-butylamine were dissolved in 5000 parts of toluene, and the temperature of the resulting solution was maintained at 40° C. Air was passed through the solution at a rate of 5000 to 6000 parts by volume/minute, and the reaction was started with stirring. When 110 minutes passed after the initiation of the reaction, the introduction of air was stopped, and a solution of 4 moles, per mole of the copper compound in the catalyst used, of tetrasodium diethylenetriaminepentaacetate and 3 moles, per mole of the copper compound, of sodium dithionite in one-tenth time the volume of the reaction mixture of water was added to the reaction mixture, and the mixture was stirred vigorously. The mixture was then allowed to stand to separate the aqueous solution, and the residue was washed with one-tenth time its volume of water. Then, the reaction mixture was concentrated until its weight became half or below the initial weight. Methanol was added to the reaction mixture to recover the polymer. The polymer obtained had a high level of whiteness and an intrinsic viscosity of 0.520 dl/g. This intrinsic viscosity was the same as the intrinsic viscosity of the polymer recovered by addition of methanol to a sampled portion of the reaction mixture immediately before the termination of the polymerization.

When the reaction mixture was allowed to stand at 20° C without performing the above treatment, but for the same period of time as required in the above treatment, the polymer recovered from it had an intrinsic viscosity of 0.4000 dl/g. This shows that when the polymerization was not terminated, there was an evident decrease in the molecular weight of the polymer obtained.

EXAMPLE 5

The same oxidative polycondensation and the same treatment of the reaction mixture as in Example 2 were performed except that 10 moles, per mole of the copper compound, of sodium sulfite was used instead of the sodium dithionite. Similar results were obtained.

EXAMPLE 6

A solution of 1300 parts of 2,6-xylenol in 1450 parts of toluene was added dropwise over the course of 40 minutes to a solution consisting of 11550 parts of toluene, 1030 parts of n-butylamine and 6.43 parts of cuprous iodide while passing air through the solution at a rate of 14400 parts by volume/minute with stirring at 40° C. After the addition, the reaction was continued for an additional 40 minutes, and then the stirring and the air blowing were stopped. The reaction mixture was divided into portions, and immediately treated by the following procedures.

Treatment procedure A

The reaction mixture was maintained at 35° to 40° C for 4 hours. Then, a large quantity of methanol containing nitric acid was added to precipitate the polymer, and the polymer was recovered.

Treatment procedure B

A solution of 3 moles, per mole of the copper compound present in the reaction mixture, of EDTA and 3.5 moles, per mole of the copper compound, of sodium dithionite in one-tenth time the volume of the reaction mixture of water was added immediately to the reaction mixture, and the mixture was stirred for 30 minutes. The aqueous phase was separated by standing, and the residue was washed three times with water in an amount one-fifth time the volume of the reaction mixture. Methanol was then added to precipitate and recover the polymer.

Treatment procedure C

After washing with water in the treatment procedure B, the reaction mixture was concentrated by an evaporator until its weight became half the initial weight. Methanol was added in a corresponding amount to precipitate and recover the polymer.

Treatment procedure D

The reaction mixture concentrated in the treatment procedure C was sprayed together with hot water in an atmosphere of heated nitrogen to evaporate off the solvent, and the polymer was recovered.

The intrinsic viscosity, whiteness and stability of each of the polymers obtained were determined, and the results are shown in Table 3

Table 3

| Treating procedure | Intrinsic viscosity (in $CHCl_3$ at 25° C, dl/g) | Coloration of the starting polymer | | Degree of coloration of polymer after heat-deterioration test** | |
|---|---|---|---|---|---|
| | | Transmittance (%)* | Whiteness (%)* | Transmittance (%)* | Whiteness (%)* |
| Polymer immediately before termination of the reaction (control) | 0.59 | — | — | — | — |
| Treatment procedure A | 0.45 | 94.9 | 83.0 | Insoluble (gelled) | Insoluble (gelled) |

Table 3-continued

| Treating procedure | Intrinsic viscosity (in CHCl₃) at 25° C, dl/g | Coloration of the starting polymer | | Degree of coloration of polymer after heat-deterioration test** | |
|---|---|---|---|---|---|
| | | Transmittance (%)* | Whiteness (%)* | Transmittance (%)* | Whiteness (%)* |
| Treatment procedure B | 0.58 | 95.4 | 85.0 | 76.9 | 49.7 |
| Treatment procedure C | 0.58 | 95.7 | 80.0 | 80.5 | 50.0 |
| Treatment procedure D | 0.59 | 95.3 | 80.0 | 81.0 | 50.0 |

*Whiteness by a Hunter's whiteness tester (at 25° C in chloroform).
**The sample was allowed to stay for 10 minutes at 250° C in a heated chamber of a Shimadzu Koka-type flow tester. Then, it was extruded into a strand, and dissolved in chloroform for measurement.

EXAMPLE 7

A four-necked flask equipped with a thermometer, a reflux condenser, a stirrer and a gas inlet tube was charged with 60 parts of xylene, 20 parts of pyridine and 0.42 part of manganese-(II) chloride, and then oxygen was introduced into it with stirring at 50° C. To the reaction mixture was added 4.0 parts of 2,6-xylenol, and the reaction was carried out for 6 hours while introducing oxygen. The introduction of oxygen was then stopped, and the reaction mixture was mixed with a previously prepared aqueous solution of 2.0 moles, per mole of the manganese compound in the catalyst used in the polymerization, of EDTA and 4.0 moles, per mole of the manganese compound, of sodium dithionite in one-tenth time the volume of the reaction mixture of water. The mixture was vigorously stirred, and allowed to stand to separate the aqueous solution.

The same reaction as above was carried out without adding EDTA and sodium dithionite.

The intrinsic viscosities of the polymers obtained in these two reactions were compared with each other. It was found that both of these polymers had an intrinsic viscosity (at 25° C in chloroform) of 0.59 dl/g immediately after they began to be allowed to stand. After standing for 10 hours, the polymer obtained after treatment with EDTA and sodium dithionite showed no change in intrinsic viscosity, whereas the intrinsic viscosity of the polymer obtained without such treatment decreased to 0.51 dl/g.

EXAMPLE 8

A four-necked flask equipped with a thermometer, a reflux condenser, a stirrer and a gas inlet tube was charged with 100 parts of benzene, 1.3 parts of tetramethylethylenediamine, 0.3 part of anhydrous cobalt-(II) chloride and 4 parts of anhydrous magnesium sulfate, and the mixture was maintained at 60° C. Then, 6 parts of 2,6-xylenol was added, and the mixture was stirred vigorously while introducing oxygen. After the absorption of oxygen almost ended, the introduction of oxygen was stopped. The reaction mixture was quickly filtered, and the filtrate mixed with a previously prepared aqueous solution of 2.0 moles, per mole of the cobalt compound in the catalyst used in the polymerization, of EDTA and 4.0 moles, per mole of the cobalt compound, of sodium dithionite in one-tenth time the volume of the reaction mixture of water. The mixture was vigorously stirred, and allowed to stand to separate the aqueous solution.

The same reaction and after-treatment as above were carried out without adding EDTA and sodium dithionite, and the reaction mixture was allowed to stand.

The polymers obtained in the two reactions above had an intrinsic viscosity of 0.50 dl/g immediately after they began to be allowed to stand. After standing for 24 hours, the polymer obtained by treatment with EDTA and sodium dithionite still had an intrinsic viscosity of 0.50 dl/g, whereas the intrinsic viscosity of the polymer obtained without adding these compounds decreased to 0.45 dl/g.

EXAMPLE 9

The same procedure as in Example 1 was repeated except using 3.0 moles of nitrilotriacetic acid and 4.0 moles of sodium dithionite instead of 2.0 moles of DETA and 2.0 moles of sodium dithionite in Example 1. The polyphenylene ether recovered from the reaction mixture had an intrinsic viscosity (in chloroform at 25° C) of 0.50 dl/g which was the same as the intrinsic viscosity of the polymer immediately before the termination of the polymerization.

EXAMPLE 10

143 Parts of n-butylamine and 0.89 part of cuprous iodide were dissolved in 1000 parts of toluene, and at 40° C, air was passed through the solution at a rate of 2000 parts by volume/minute with stirring. A solution of 180 parts of 2,6-xylenol in 800 parts of toluene was added dropwise over the course of 40 minutes. After the addition, the reaction was continued, and after a lapse of 75 minutes from the initiation of the addition of the monomer, the air blowing and stirring were stopped. Immediately, a previously prepared mixture of 2.0 moles, per mole of the copper compound in the catalyst used in the polymerization, of EDTA and 2.5 moles, per mole of the copper compound, of sodium dithionite was added to the reaction mixture, and the mixture was vigorously stirred, followed by standing to separate the aqueous phase formed by the polycondensation reaction. The polyphenylene ether recovered from the reaction mixture which had been subjected to the above treatment had an intrinsic viscosity (at 25° C in chloroform) of 0.49 dl/g which was substantially the same as the intrinsic viscosity of the polymer immediately before the termination of the polymerization (i.e., 0.50 dl/g.

What we claim is:

1. In a process for producing polyphenylene ethers which comprises reacting phenols with oxygen in the presence of a complex catalyst containing at least one metallic compound selected from the group consisting of copper compound, manganese compound and cobalt compound, the improvement which comprises terminating the polymerization reaction by adding an aminocarboxylic acid derivative and a reducing agent to the polymerization reaction mixture at a stage of the desired degree of polymerization of the resulting polyphenylene ether, said aminocarboxylic acid derivative being at least one member selected from the group consisting of polyalkylene polyamine polycarboxylic acids, cycloalkylene polyamine polycarboxylic acids, polyalkylene ether polyamine polycarboxylic acids, aminopolycarboxylic acids, aminocarboxylic acid, alkali metal or alkaline earth metal salts of these acids, and alkali metal-/alkaline earth metal mixed salts of these acids, and said reducing agent being at least one member selected from the group consisting of sulfur suboxides, salts of lower oxyacids of sulfur, salts containing a metal in lower atomic valency of higher oxyacids or hydroacids, nitrogen-containing reducing compounds selected from the group consisting of hydroxylamine and salts thereof and hydrazine and boron hydride said aminocarboxylic acid derivative being added in an amount of at least 1 mole per mole of the metallic compound in said complex catalyst said reducing agent being added in an amount of 1.0 to 15.0 moles per mole of the metallic compound in the complex catalyst.

2. The process of claim 1 wherein said aminocarboxylic acid derivative is ethylenediaminetetraacetic acid or its salts, nitrilotriacete acid or its salts, or diethylenetriaminepentaacetic acid or its salts.

3. The process of claim 1 wherein said reducing agent is a dithionite salt, hydrazine or a sulfite salt.

4. The process of claim 1 wherein the aminocarboxylic acid derivative and reducing agent are used in the form of an aqueous solution.

* * * * *